(12) United States Patent
Higginbotham, III

(10) Patent No.: US 6,695,184 B2
(45) Date of Patent: Feb. 24, 2004

(54) BICYCLE CARRIER

(76) Inventor: Hugh R. Higginbotham, III, 2409 24th Way, West Palm Beach, FL (US) 33407

( * ) Notice: Subject to any disclaimer, the term of this patent is extended or adjusted under 35 U.S.C. 154(b) by 117 days.

(21) Appl. No.: 10/090,534

(22) Filed: Mar. 4, 2002

(65) Prior Publication Data

US 2003/0164390 A1 Sep. 4, 2003

(51) Int. Cl.⁷ .............................. B60R 9/06; B60R 9/10
(52) U.S. Cl. ...................... 224/501; 224/510; 224/519; 224/537; 224/924
(58) Field of Search ................................. 224/501, 510, 224/519, 552, 571, 924, 521, 534, 537; 280/762

(56) References Cited

U.S. PATENT DOCUMENTS

| | | | | |
|---|---|---|---|---|
| 3,367,548 A | * | 2/1968 | Cooper ........................ 224/924 |
| 4,189,274 A | * | 2/1980 | Shaffer ........................ 224/510 |
| 4,411,461 A | * | 10/1983 | Rosenberg ................... 224/510 |
| 4,815,638 A | * | 3/1989 | Hutyra ........................ 224/924 |
| 5,096,102 A | * | 3/1992 | Tolson ........................ 224/537 |
| 5,129,559 A | * | 7/1992 | Holliday ...................... 224/519 |
| 5,871,131 A | * | 2/1999 | Low et al. ................... 224/519 |
| 5,881,937 A | * | 3/1999 | Sadler ......................... 224/510 |
| 6,019,266 A | * | 2/2000 | Johnson ....................... 224/924 |
| 6,491,195 B1 | * | 12/2002 | McLemore et al. .......... 224/924 |

* cited by examiner

Primary Examiner—Gary E. Elkins
(74) Attorney, Agent, or Firm—Norman Friedland

(57) ABSTRACT

A bicycle carrier primarily designed for transporting an off-road bicycle by a motor vehicle is designed to fit onto the trailer hitch of the motor vehicle. A channel member is supported to a support member and a cross member that fits into the trailer hitch and an upstanding post with a plurality of holes for receiving a locking pin. A locking arm is slidably mounted on the vertical post and when the bicycle is guided onto the channel member the locking arm is positioned downwardly with sufficient force to arm the shocking system of the bicycle and preload the bicycle to the carrier.

9 Claims, 4 Drawing Sheets

BICYCLE CARRIER

TECHNICAL FIELD

This invention relates to bicycle carriers and particularly of the type of carrier that is mounted at the rear of a motor vehicle and is of the type that can be utilized for motorized bicycles that are of sufficient weight where lifting is not possible or convenient.

BACKGROUND OF THE INVENTION

As is well known in this technology there are sundry types of carriers that are commercially available that are intended for carrying bicycles. As for example, one type of carrier is mounted on the top of the trunk of a automobile and is strapped down and geld in position by the structure of the automobile. Another similar type is placed on the top of the automobile or motor vehicle. These types of carriers are typically used for unmotorized bicycles that are sufficiently light in weight that the user can lift the bicycle and place it on the carrier. Another type of carrier which is typically used for motorized bicycles is a bed or channel supported to the trailer hitch of the motor vehicle that requires cable or the like to anchor the bicycle to the bed or channel. This invention, while can be used to carry unmotorized bicycles, it is intended to carry motorized bicycles sometimes referred to as "dirt bikes" or "off-road bikes" and could, under certain conditions carry motorcycles.

It is contemplated by this invention that the shock system of the bicycle can be utilized to help stabilize the bike when being transported by the carrier although the invention could be employed without depending on the bicycles shock system. According to this invention, the bicycle carrier is supported in a typical commercially available trailer hitch of the class 3 type where a rectangular or square tube member fits into a complementary recess or opening in the trailer hitch. A channel member is mounted perpendicular to the tube member and the channel is sufficiently wide to receive the wheels of the bicycle. A vertical member is supported by a cross member that is adapted to fit into a trailer hitch and the vertical member includes a sliding arm that is vertically adjustable on the tube member and the arm fits over the bicycle and is locked into place for supporting the bicycle to the motor vehicle. The channel member may be removable for shipping and/or storage purposes. The inventive carrier is characterized as being relatively light in weight, simple in design and construction and easy to use, yet reliable for carrying dirt bikes and the like.

SUMMARY OF THE INVENTION

An object of this invention is to provide an improved carrier for dirt bikes and the like that removably supports the bicycle to a motor vehicle.

A feature of this invention is the use of a channel member that is supported in the trailer hitch mounted on a motor vehicle that is oriented in the direction of the bumper of the motor vehicle and a vertical post with a support arm that holds the bicycle in place and a locking pin that locks the support arm in place to hold the bicycle. The shock system of the bicycle can be utilized by forcing the bicycle downwardly before locking the support arm.

An object of this invention is to provide an improved carrier for supporting an off-road bicycle to the rear of a motor vehicle that is characterized as being relatively inexpensive, easy to mount to the motor vehicle and easy to attach to the bicycle. The use of the shocks of the off-road bicycle enhances the stability of the bicycle when in transient.

The foregoing and other features of the present invention will become more apparent from the following description and accompanying drawings.

Figure 1:
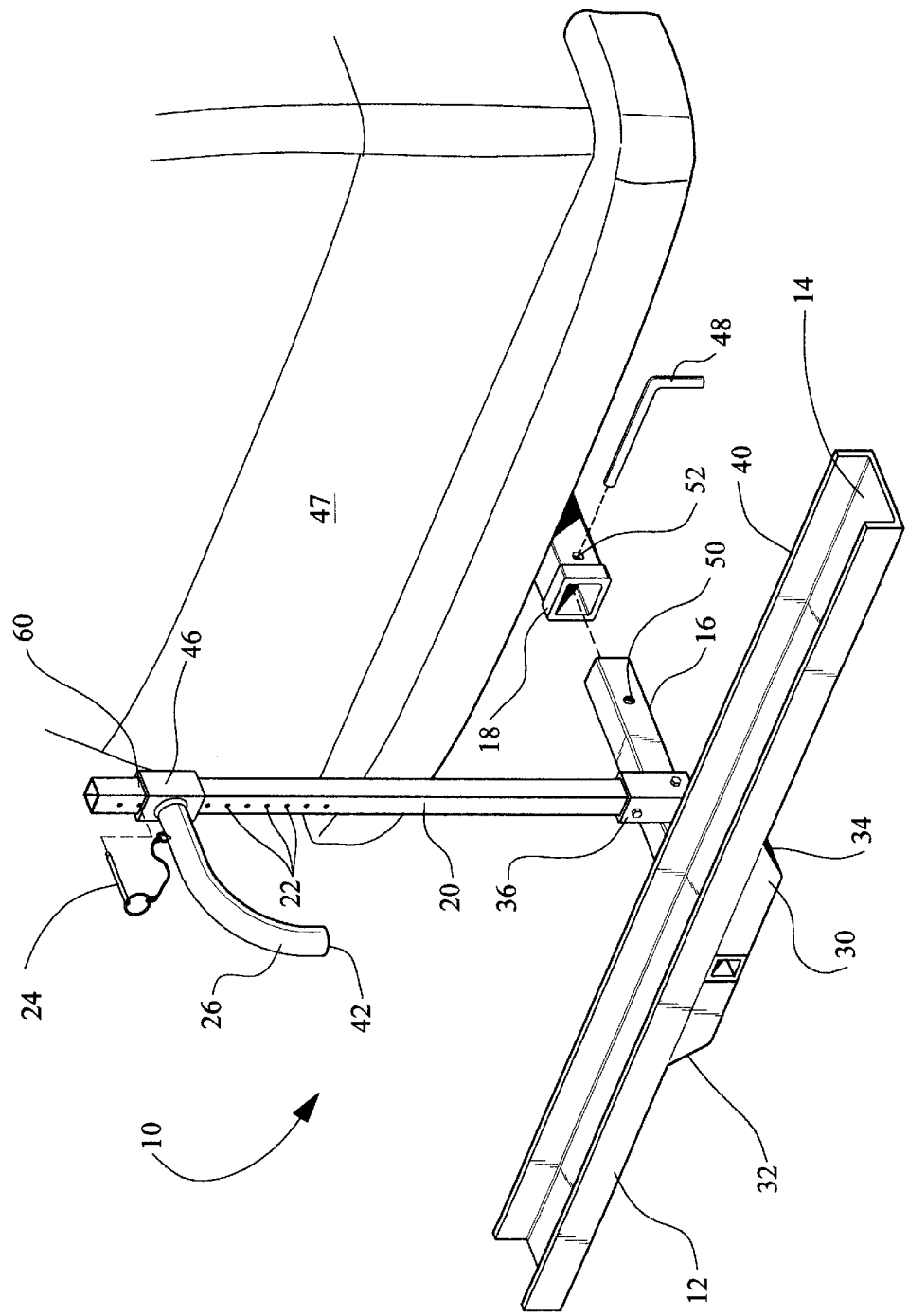
FIG. 1 is an exploded view in perspective and a schematic view illustrating the details of this invention.
Figure 2:
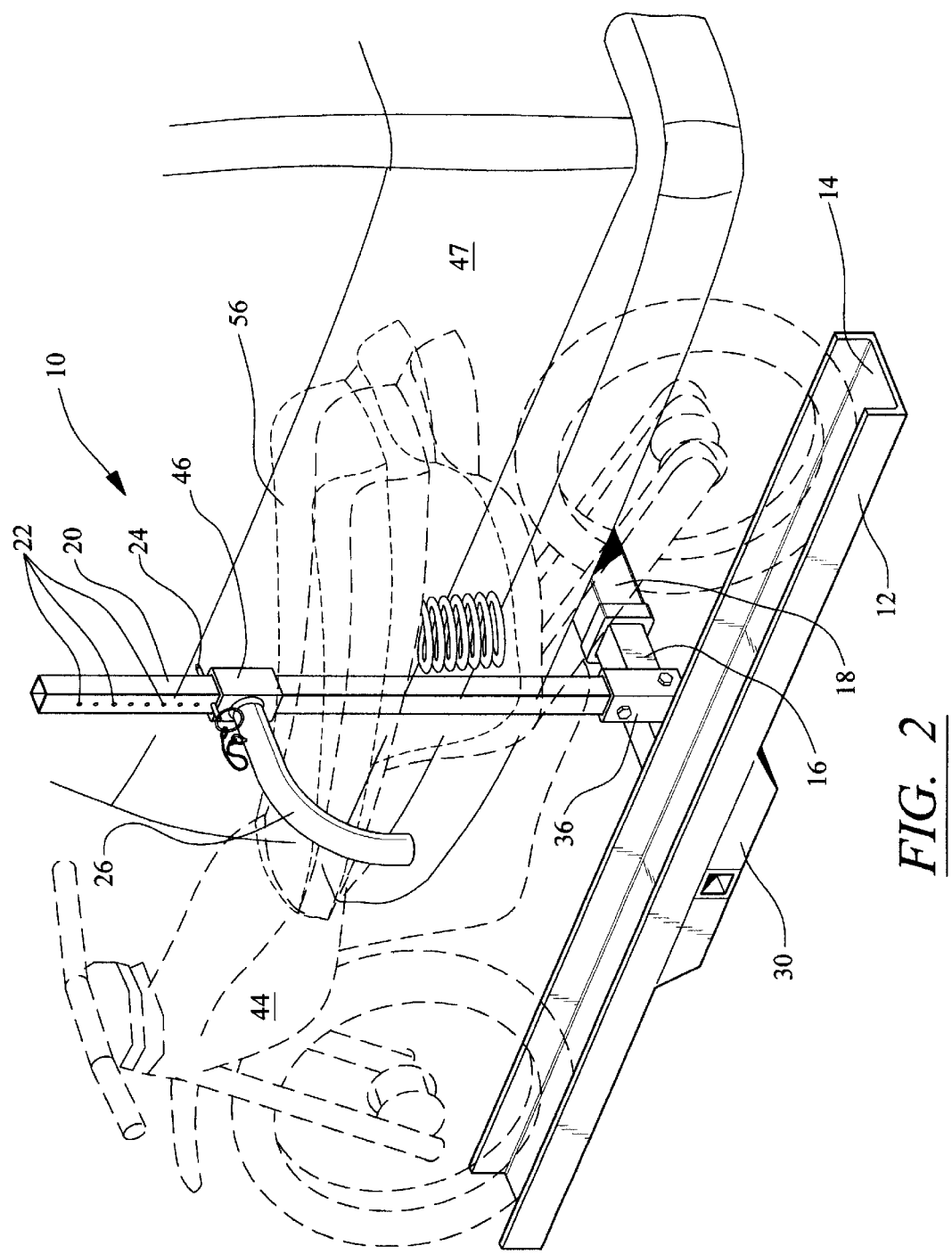
FIG. 2 is a view in perspective, schematic and phantom illustrating an off-road bicycle mounted on the rear end of a motor vehicle.

These figures merely serve to further clarify and illustrate the present invention and are not intended to limit the scope thereof.

DETAILED DESCRIPTION OF THE DRAWINGS

While in the preferred embodiment this invention is being described to carry an off-road or dirt bicycle on a motor vehicle, it is to be understood as will be appreciated by those skilled in this art, that the carrier of this invention can be utilized for carrying other types of two wheeled vehicles. Further, in the preferred embodiment certain elements are made from an aluminum or aluminum alloy material and it should be understood that any other suitable material can be used without departing from the scope of this invention.

This invention can best be understood by referring to all of the Figs. where the carrier is generally illustrated by reference numeral 10 consisting of a channel member 12 having a straight through channel 14 that is sufficiently wide to receive the wheels of the off-road bicycle, (hereinafter referred to as "bicycle"), a cross member 16 designed to fit into a standard, commercially available class 3 trailer hitch 18, a vertical post 20 with a plurality of vertically spaced holes 22 adapted to receive pin 24 and a locking arm 26 slidably mounted on the vertical post 20. The channel member 12 is suitably attached to the support member 30, say by commercially available bolts 31. The removal of the channel member 12 is thusly, a simple matter of undoing the bolts 31 so that the the carrier can easily be shipped and/or stored. The support member 30 may be formed in two pieces 32 and 34 and is attached, say by, welding to the cross member 30. A stub support tubular member 36 is attached to the cross member 16, say by suitable bolt 37 and a weldment and is spaced from the outer face 40 of the channel member 12 and includes a square shaped opening for supporting the vertical post to the cross member 16. A suitable bolt 39 may be used for affixing the vertical member 20 to the stub support tubular member 36. The arm 26 which is a circular member is contoured to form an arc with the end portion 42 facing in a downward direction. The radius of the arc is selected to encircle the seat of the bicycle 44 as will be described in detail hereinbelow. The arm 26 is suitably attached to the sleeve 46 that is slidably mounted on the vertical post 20. The pin 24 may be loosely attached to the arm 26 by a string or cable or the like that is, also attached to the end of pin 24. The diameter of the pin 24 complements the vertical holes 22. For lightness of weight and other advantages, the cross member 16, the vertical member 20, the stub support member 36, the sleeve 46 and the arm 26 are all made from tubular stock and preferably from aluminum material.

In operation, the carrier 10 is mounted to the receiver of the trail hitch 18, which is affixed to the motor vehicle 47 by inserting the cross member into the opening of the trail hitch 18 and locking it in place by the pin 48 that is inserted into the complementary openings 50 formed in the cross piece 16 and 52 formed in the trailer hitch 18. At this point the arm 26 is held higher than the seat 56 of the bicycle so that when the bicycle is placed in the channel 14 of channel member 12, the bicycle is oriented so that the arm 26 is over the seat 56. In the preferred embodiment, once the bicycle is in position, the operator forces the arm 26 downwardly and applies pressure so that the force displaces the shock or spring of the bicycle in a downward position. The pin 24 is then inserted into one of the openings 22 so that the pin overlies the top end 60 of the sleeve 46 to prevent the arm and hence, bicycle from moving upwardly.

Figure 3:
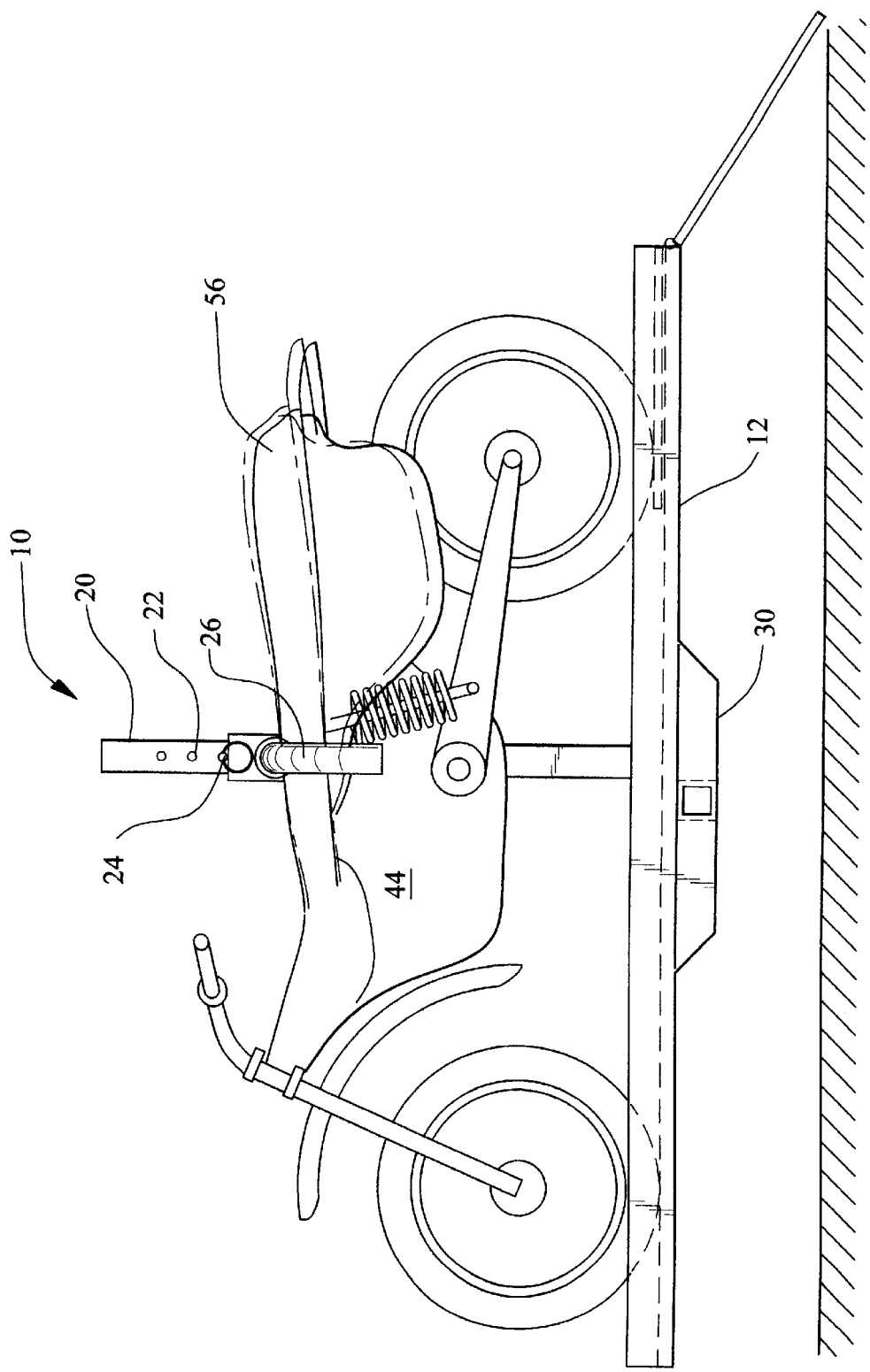
FIG. 3 is a view in elevation and schematic illustrating the off-road bicycle mounted on the carrier of this invention with a member to facilitate rolling the bicycle onto the carrier.
Figure 4:
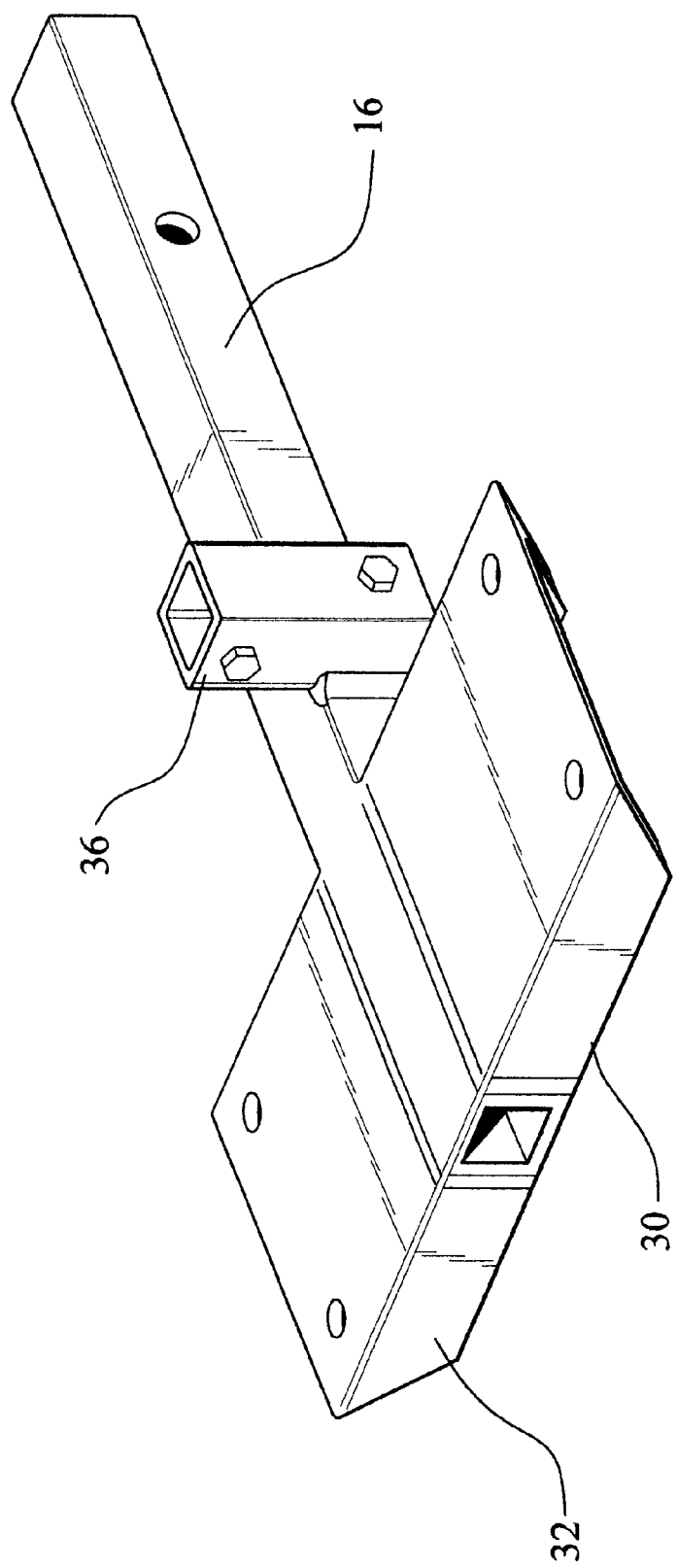
FIG. 4 is a partial view illustrating the details of the support member, the cross member and the channel member of this invention.

It is apparent from the foregoing that the bicycle is preloaded on the carrier, which has a stabilizing effect on the bicycle and lessens or alleviates the handling of the motor vehicle. It will also be apparent from the foregoing that the bicycle is mounted perpendicular to the central axis of the motor vehicle which also enhances the handling of the motor vehicle. As shown in FIG. 3, a ramp can be used to guide the bicycle into the channel 14 of the channel member 12. While the ramp shown in this disclosure is simply a block of wood it is contemplated by this invention, that a guide or ramp made from a metallic material can be pivotably mounted to the channel member 12 and stored thereby when not being deployed.

Although this invention has been shown and described with respect to detailed embodiments thereof, it will be appreciated and understood by those skilled in the art that various changes in form and detail thereof may be made without departing from the spirit and scope of the claimed invention.

I claim:

1. A bicycle carrier for a motor vehicle for transporting an off-road type of bicycle, said motor vehicle having a trailer hitch, said bicycle carrier includes a channel member having a channel wide enough to accommodate the width of the wheels of the bicycle, a cross member perpendicularly attached to the channel member and mounted thereto intermediate the ends of said channel member, a vertical post attached to said cross member, a locking arm slidably mounted to said vertical post, whereby said arm overlies the bicycle when the bicycle is fitted on the channel member, said arm is arcuately shaped and having a downward depending end that fits over the seat of the bicycle and a pin removably mounted into one of a plurality of vertically spaced holes formed in said vertical member overlies said locking arm to prevent said locking arm from moving vertically whereby said bicycle is supported to said carrier and the cross member of said carrier is removably attached to the trailer hitch of a motor vehicle.

2. A bicycle carrier as claimed in claim 1 including a support member affixed to said channel member and attached to said cross member.

3. A bicycle carrier as claimed in claim 2 including a plurality of bolts wherein said channel member and said support member are attached to each other by said plurality of bolts whereby said channel member is removable for shipping and storing purposes.

4. A bicycle carrier as claimed in claim 1 wherein said cross member and said vertical member is a tubular configuration.

5. A bicycle carrier as claimed in claim 4 including a sleeve slidably mounted on said vertical member and said arm being affixed to said sleeve.

6. A bicycle carrier as claimed in claim 5 where in said pin is loosely affixed to said arm.

7. An off-road motorcycle carrier adapted to be removably mounted on a motor vehicle including a channel member having a channel wide enough to accommodate the width of the wheels of the off-road motorcycle, a cross member perpendicularly attached to the channel member and mounted thereto intermediate the ends of said channel member, a vertical post attached to said cross member, a locking arm slidably mounted to said vertical post, said arm is arcuately shaped and having a downward depending end that fits over the seat of the off-road motorcycle being carried by said bicycle off-road motorcycle carrier, a pin for insertion in an aperture in said vertical post to set said arcuately shaved arm at different heights, said arcuately shaped arm extending beyond said seat and said off-road motorcycle having a suspension system wherein said arcuately shaped arm when locked into position on said vertical Post exerts a force on said off-road motorcycle to rigidly support said off-road motorcycle and minimize movement thereof while said motor vehicle is in motion, said motor vehicle including a trailer hitch and means operatively connected to said off-road motorcycle carrier removably mounted to said trailer hitch.

8. The method of supporting an off-road bicycle to a carrier that is mounted in the trailer hitch of a motor vehicle including the steps of i) providing a channel member having a channel sufficiently wide to receive the wheels of the bicycle, a cross member affixed to the channel member that fits into the trailer hitch, a vertical member attached to the cross member and a movable arm on said vertical member, ii) removably affixing said cross member into the trailer hitch, iii) placing said off-road bicycle on said channel member in a position where the seat of the bicycle is in line with the movable arm and the bicycle is between said movable arm and said channel member, iv) positioning the movable arm to force the seat of the bicycle to displace the shocking system of the bicycle and preload the bicycle on the bicycle carrier; and v) locking the movable arm in place subsequent to the step of iv.

9. The method as claimed in claim 8 including the step of removably mounting the channel member so that it is removable for shipping and storing purposes.

* * * * *